(12) United States Patent
Reif (10) Patent No.: US 10,416,837 B2
(45) Date of Patent: Sep. 17, 2019

(54) VIRTUAL REALITY SAFETY BOUNDING BOX

(71) Applicant: Facebook, Inc., Menlo Park, CA (US)

(72) Inventor: Daniel Jacob Reif, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/633,416

(22) Filed: Jun. 26, 2017

(65) Prior Publication Data

US 2018/0373412 A1 Dec. 27, 2018

(51) Int. Cl.
*G06F 3/0481* (2013.01)
*G06T 19/00* (2011.01)
*G02B 27/01* (2006.01)
G06F 3/01 (2006.01)
G06T 13/20 (2011.01)

(52) U.S. Cl.
CPC ..... *G06F 3/04815* (2013.01); *G02B 27/0172* (2013.01); *G06F 3/012* (2013.01); *G06F 2203/04804* (2013.01); *G06T 13/20* (2013.01)

(58) Field of Classification Search
CPC .......................... G06F 3/04815; G06T 19/006
See application file for complete search history.

(56) References Cited

U.S. PATENT DOCUMENTS

| 6,016,150 | A  | * | 1/2000  | Lengyel  | G06T 11/001 |
|           |    |   |         |          | 345/426     |
| 9,729,864 | B2 | * | 8/2017  | Stafford | G02B 27/017 |
| 2016/0171771 | A1 | * | 6/2016 | Pedrotti | G02B 27/017 |
|           |    |   |         |          | 345/633     |
| 2016/0313790 | A1 | * | 10/2016 | Clement | G06F 3/011 |
| 2016/0350973 | A1 | * | 12/2016 | Shapira | G06T 19/006 |

* cited by examiner

*Primary Examiner* — Yi Yang
(74) *Attorney, Agent, or Firm* — Fenwick & West LLP (57) ABSTRACT

A virtual reality (VR) system identifies a bounding box including a safe region. The bounding box encloses an area that allows a user wearing a head mounted display (HMD) to safely view content of a virtual world. The VR system identifies the user's location relative to the bounding box and tracks the user's location. When it is determined that the user is located outside the safe region of the bounding box, the VR system can modify what is presented to the user via the HMD, can warn the user, and/or can suggest that the user move back to the safe region.

20 Claims, 6 Drawing Sheets

VIRTUAL REALITY SAFETY BOUNDING BOX

BACKGROUND

This disclosure relates generally to a vision system, and more specifically, to an image processing system that enables displaying a virtual scene to a user.

Virtual reality (VR) technology and corresponding equipment like head mounted displays (HMDs) or VR headsets are becoming increasingly popular. A virtual scene rendered to a user wearing an HMD provides an interactive experience in a virtual environment. At times, instead of standing in a fixed position, the user intends to move around while wearing the HMD, expecting to continuously experience the virtual environment while moving. However, in some conventional VR systems, while a user wearing an HMD is moving around, the user may move "outside" the virtual environment being experienced, which degrades the user experience associated with the virtual environment. In some cases, under conventional approaches, the user may undesirably bump, hit, crash, or otherwise make physical contact with a real-world object and hurt himself/herself, which also degrades the user experience associated with the virtual environment.

SUMMARY

Embodiments of the disclosure can include a virtual reality (VR) system that enables a user wearing a head mounted display (HMD) to safely move around while still experiencing a virtual world or environment displayed via the HMD to the user. In some embodiments, the HMD can include an input component or camera configured to capture image data (e.g., still frame data, video data, etc.). For instance, the camera can be facing, within an allowable deviation, the same direction as the user is facing. In this instance, the camera can capture image data representing a real-world scene in a real-world environment that is similar to what the user may see if he/she is not wearing the HMD.

In some implementations, the VR system can define or identify a set of boundaries forming a bounding box within which a user wearing an HMD can safely move. The bounding box, as used herein, refers to a bounding region including a center and a boundary (i.e., one or more boundaries). For instance, the bounding box can form a polyhedron. In another instance, the bounding box can form a circle with a boundary that corresponds to the circle's circumference. In a further instance, the bounding box can form a rectangle with a boundary that includes a top boundary, a bottom boundary, a left boundary, and a right boundary. Within the bounding box, the user wearing the HMD can view at least a portion of a virtual world the HMD is configured to display to the user. The user is capable of safely moving inside the bounding box to view the virtual world displayed to the user. Within the bounding box, the virtual world is displayed to the user in the HMD and typically prevents the user from directly viewing the external environment in which the user is moving. In one embodiment, the bounding box includes a safe region and a warning region. For example, the user can experience a full (e.g., 100%) opacity rendering of the virtual world when the user is located inside the safe region. As the distance between the user and the center of the bounding box increases (e.g., when the user moves past the safe region and reaches the warning region), the view of the virtual world can "transition" to a view of the real world, to provide a warning that the user is approaching the boundary of the region in which the user may safely move. Thus, the opacity of the rendered virtual world can be reduced and the opacity of the real world, which is presentable via the HMD based on image data captured by a camera of the HMD, can be increased. In other words, a level of transparency for the virtual world displayed via the HMD can be increased and a level of transparency for the real world displayed via the HMD can be reduced. Continuing with the example, when the user moves past the warning region, the user can be shown 0% opacity (i.e., 100% transparency) of the virtual world and 100% opacity (i.e., 0% transparency) of the real world. In other words, outside the warning region, the disclosed technology may enable the user to only see the real world (i.e., the rendered representation thereof) and not the virtual world. Accordingly, this can reduce the likelihood that the user will bump, hit, crash, or otherwise undesirably make physical contact with a real-world object while wearing the HMD and moving.

In some cases, the VR system can also identify the user's location within the bounding box. For instance, the user wearing the HMD may be located at the center of the bounding box, somewhere away from the center but in the safe region, somewhere in the warning region, or somewhere outside the warning region, etc. In some cases, when the user is located in the warning region or outside the bounding box, the VR system can modify what is displayed by the HMD. In some embodiments, when the user is located in the warning region or outside the bounding box, the VR system can provide a notification or recommendation to the user for the user to move back into the safe region of the bounding box. In some implementations, the VR system can also inform or notify the user of his/her current location even while the user is located within the safe region of the bounding box. Alternatively, in some embodiments, the center for the bounding box need not be defined, identified, and/or utilized. Instead, in one instance, a distance between the location of the user and the boundary(ies) for the safe region can be determined. In another instance, a distance between the location of the user and the boundary(ies) for the warning region can be determined. Based on such distances, the VR system can determine what to present to the user via the HMD. For example, when the distance between the user and the boundary(ies) of the warning region is greater than a first threshold, the VR system can cause one or more virtual scenes of the virtual environment to be displayed to the user. When the distance between the user and the boundary(ies) of the warning region is less than the first threshold but greater than a second threshold (e.g., zero), the VR system can cause a combination of the virtual scene(s) and a real-world scene(s) of a real-world environment to be displayed to the user. In this example, the opacity and/or transparency levels of the virtual scene(s) and of the real-world scene(s) can be modified based on this distance. It should be appreciated that many variations are possible.

The figures depict various embodiments of the disclosed technology for purposes of illustration only. One skilled in the art will readily recognize from the following discussion that alternative embodiments of the structures and methods illustrated herein may be employed without departing from the principles of the technology described herein.

DETAILED DESCRIPTION

System Architecture

Figure 1:
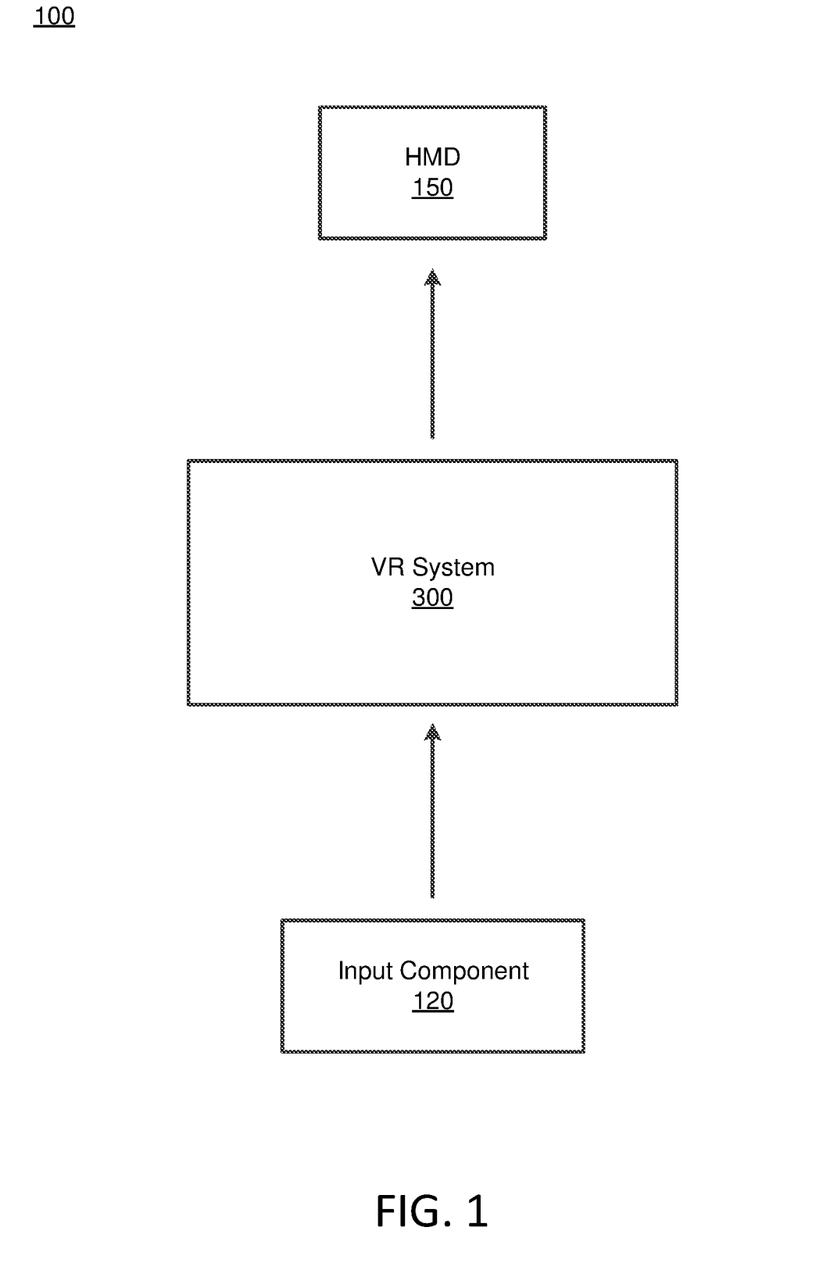
FIG. 1 illustrates a block diagram of an example system environment in which a VR system operates, in accordance with an embodiment.

FIG. 1 shows a block diagram of a system environment 100 in which a virtual reality (VR) system 300 operates, according to one embodiment. The system environment 100 shown in FIG. 1 includes an input component 120, a VR system 300, and a head mounted display (HMD) 150. Only one input component, one VR system, and one HMD are shown in FIG. 1 for purposes of illustration. In alternative embodiments not explicitly shown, the system environment 100 can include multiple input components 120, VR systems 300, HMDs 150, and different and/or additional components. Likewise, the functions performed by various entities in the system environment 100 may differ in different embodiments.

The input component 120 can be configured to capture image data (e.g., one or more still frames, one or more video image frames, etc.) of a real-world scene in a local area. The local area can be an environment in reality (e.g., in the real world) where a user wearing the HMD 150 is located. For example, the user wearing the HMD 150 may stand or sit in an environment and may face a particular real-world scene in the local area. In one embodiment, the input component 120 is an outward facing camera installed on the HMD 150. For instance, the camera can be facing, within an allowable deviation, a direction in which the user wearing the HMD 150 is facing. In some implementations, the input component 120 can detect and/or capture image data representing the real-world scene that the user wearing the HMD 150 would see if he/she was not wearing the HMD 150. The input component 120 can provide the information that it detects and/or captures (e.g., the image data representing the real-world scene) to the VR system 300.

In some embodiments, the HMD 150 can be included as a part of the VR system 300. In some embodiments, the HMD 150 can be separate from, but utilized by, the VR system 300. In one example, the HMD 150 can correspond to a VR headset that enables the user wearing it to experience a virtual environment. For instance, the HMD 150 can display one or more virtual scenes or views of the virtual environment, such that the user feels as if he/she were actually present in the virtual environment. Additionally, in some implementations, the HMD 150 can include the input component 120 (e.g., a camera facing the same direction as the user) configured to capture a view(s) or scene(s) of a real-world environment that the user would perceive if he/she was not wearing the HMD 150. In some cases, the captured data can be utilized by the VR system 300 to determine the location of the user. Moreover, the HMD 150 can be configured to receive information about the user's location. Furthermore, the HMD 150 can receive communications from the VR system 300 to present one or more notifications, warnings, recommendations, and/or suggestions, etc., to the user.

In some embodiments, the VR system 300 identifies a bounding box (which can be formed by a set of one or more boundaries), receives information provided by the input component 120, identifies the location of the user wearing the HMD 150, and/or provides information to the HMD 150 that indicates the user's location relative to the bounding box. The bounding box, as used herein, refers to an enclosed region within which the user wearing the HMD 150 is presented with one or more virtual scenes via the HMD 150. The bounding box may be associated with a region set in a real-world environment, such as a particular area within a real-world/physical room. The bounding box can be associated with a center. The bounding box can be associated with different shapes, such as a circle, an oval, a square, a rectangle, a triangle, a polygon, a polyhedron, etc. The bounding box can include or encompass a set of one or more boundaries that define a safe region. In some cases, the safe region can be defined or set to be safe, suitable, or appropriate for certain actions, but not others. For example, a particular safe region can be safe for running, but not for jumping (e.g., because the real-world environment has a corresponding omni-treadmill). In some cases, the safe region can correspond to a portion inside the set of one or more boundaries within which the user wearing the HMD 150 is presented with a virtual scene of a virtual environment. For example, when the VR system 300 determines that the user is located in the safe region, the VR system 300 can cause the HMD 150 to display the virtual scene with 100% opacity (i.e., 0% transparency). In other words, when the user wearing the HMD 150 is located inside the safe region, he/she is capable of viewing, via the HMD 150, the contents of the virtual world completely without being able to view any content rendered as being representative of the real world.

In some implementations, the bounding box can encompass or include another set of one or more boundaries that define an exterior border of a warning region. This other set of one or more boundaries defining the exterior border of the warning region can be larger than or outside of the former set of one or more boundaries defining the safe region. The warning region, as used herein, can refer to a portion inside the other set of one or more boundaries, but outside the former set of one or more boundaries defining the safe region. In some cases, when the VR system 300 determines that the location of the user wearing the HMD 150 is within the warning region, the VR system 300 can modify what is displayed to the user such that the user is presented with a combination or mixture of the virtual scene and the real-world scene. For instance, as the user initially enters the warning region, the level of opacity of the virtual scene in the virtual environment displayed to the user can be modified to be less than 100% (i.e., the level of transparency for the virtual scene can be increased from 0%) and the level of opacity of the real-world scene, as provided based on image data acquired by a camera of the HMD 150 and displayed in combination with the virtual scene to the user via the HMD 150, can be modified to be greater than 0% (i.e., the level of transparency for the real-world scene can be decreased from 100%).

In one example, the safe region can be a circular region corresponding to a middle portion within the bounding box and the warning region can be a ring portion surrounding the circular region of the safe region. In this example, the area defined by the bounding box can include the safe region and the warning region. Continuing with this example, when the user is located in the warning region, and as the distance between the user and the center of the bounding box increases, the opacity of the virtual scene displayed to the user can be decreased by the VR system 300 from 100% to 0% and the opacity of the real-world scene displayed to the user can be increased by the VR system 300 from 0% to 100%. Moreover, in some implementations, when the user's location is determined to be outside the bounding box (e.g., outside the warning region), the VR system 300 can cause the HMD 150 to cease displaying the virtual environment to the user and only display the real-world environment (as represented by image data captured by the camera of the HMD 150). An example of a bounding box and a user located inside the bounding box is provided in FIG. 2A.

In some implementations, the VR system 300 can identify or determine the location of the user wearing the HMD 150 relative to the bounding box. The user may be located inside the safe region, inside the warning region (i.e., outside the safe region but within the bounding box), or outside the bounding box (i.e., outside the safe region and the warning region). In one embodiment, the VR system 300 can send the user's identified or determined location to the HMD 150 such that the user can be notified of his/her location. As an example, when the user is located in the warning region, the VR system 300 can cause the HMD 150 to provide a warning that notifies the user that he/she is not in the safe region. The VR system 300 can also, for instance, send one or more instructions/suggestions to the user via the HMD 150 in attempt to guide him/her back to the safe region.

Figure 2A:
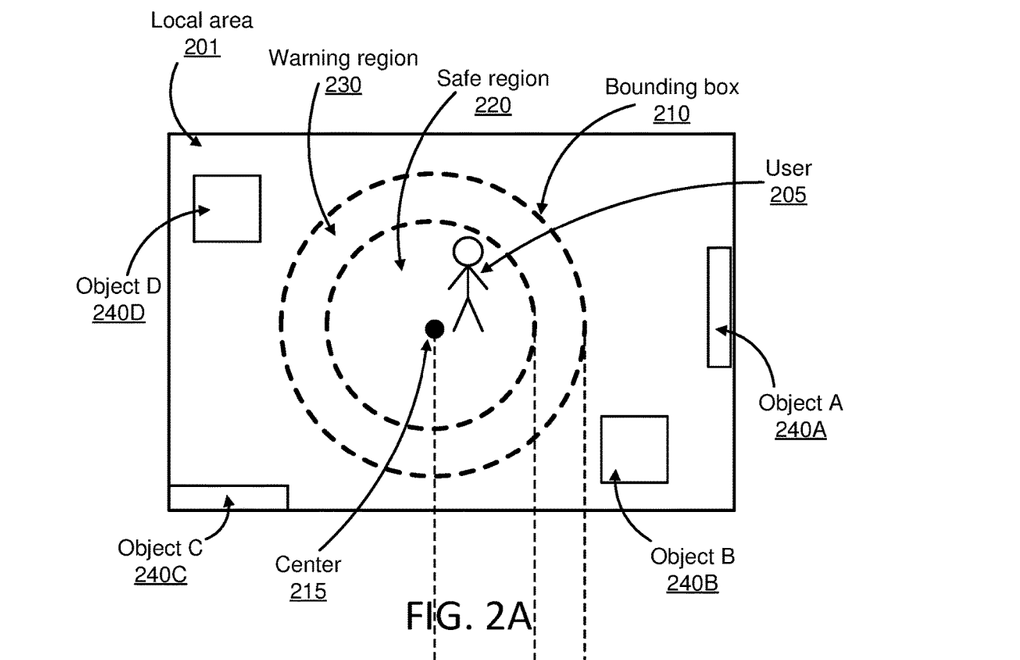
FIGS. 2A-2B illustrate an example scenario involving an example bounding box within which a user is located, in accordance with an embodiment.

FIG. 2A illustrates an example scenario 200 involving an example bounding box 210 within which a user 205 is located, in accordance with an embodiment. In FIG. 2A, the bounding box 210 is inside a local area 201, such as a room. The local area 201 can, for instance, correspond to the real world (i.e., a real-world environment) where the user is located. As shown in this example scenario 200, in some cases, there can be one or more background objects such as object A 240A, object B 240B, object C 240C, and object D 240D within the local area 201. In some implementations, the example bounding box 210 can be defined or identified by a VR system such that the objects 240A-240D are all located outside the bounding box 210.

In the example scenario 200 of FIG. 2A, the user 205 can be located inside the bounding box 210. While not explicitly illustrated, the user 205 can be wearing an HMD 150 configured to display or present to the user 205 one or more virtual scenes/views of a virtual environment provided by the VR system 300. In this example, the bounding box 210 can have a circular shape and a center 215. The inner circular portion including the center 215 can correspond to a safe region 220. The outer ring portion surrounding the safe region 220 can correspond to a warning region 230. In this example scenario 200, the user 205 can be located within the safe region 220.

Figure 2B:
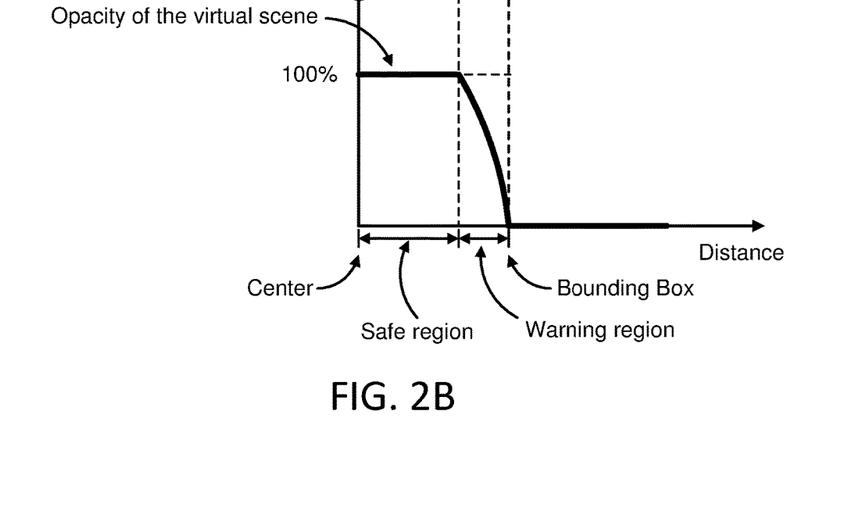

FIG. 2B illustrates the example scenario 200 of FIG. 2A involving the example bounding box 210 within which the user 205 is located, in accordance with an embodiment. In FIG. 2B, an example graph that represents the opacity level of a virtual scene displayed to the user 205 relative to a distance between the user 205 and the center 215 of the bounding box 210 is illustrated.

As shown in FIG. 2B, while the user 205 is determined to be located inside the safe region 220, such as when the distance between (the location of) the user 205 and the center 215 is less than a radius of the exterior circular boundary of the safe region 220, the VR system 300 can cause an opacity level of the rendered virtual scene to be 100%, such that the user 205 is only displayed or presented with virtual content. As illustrated in the example graph, if the user 205 moves into the warning region 230, and the distance between the user 205 and the center 215 increases beyond the radius of the safe region 220, the VR system 300 can cause the opacity level of the displayed virtual scene to decrease (e.g., from 100% to 0%) and can also cause an opacity level of a real-world scene displayed to the user 205 to increase (e.g., from 0% to 100%). For instance, as the user 205 moves within the warning region 230 and further away from the center 215, the virtual scene displayed to the user 205 can fade out gradually while the real-world scene fades in gradually. In this instance, when the user 205 is located within the warning region 230, the VR system 300 can cause a combination, blending, and/or mixture of the virtual scene and the real-world scene to be displayed to the user 205.

In some cases, if the distance between the user 205 and the center 215 increases beyond that of an exterior radius of the warning region 230, such as when the user 205 moves outside the warning region 230, the opacity level of the virtual scene can be reduced to 0% and the opacity level of the real-world scene can be increased to 100% (i.e., the VR system can cease displaying the virtual scene and can display only the real-world scene).

It should be understood that the example graph is provided for illustrative purposes and not necessarily drawn to scale. For example, it should be appreciated that the relationship between the opacity level of the virtual scene (and/or of the real-world scene) and the distance between the user 205 and the center 215 can be linear, non-linear, and/or any combination thereof. There can be many variations associated with the present disclosure.

Figure 2C:
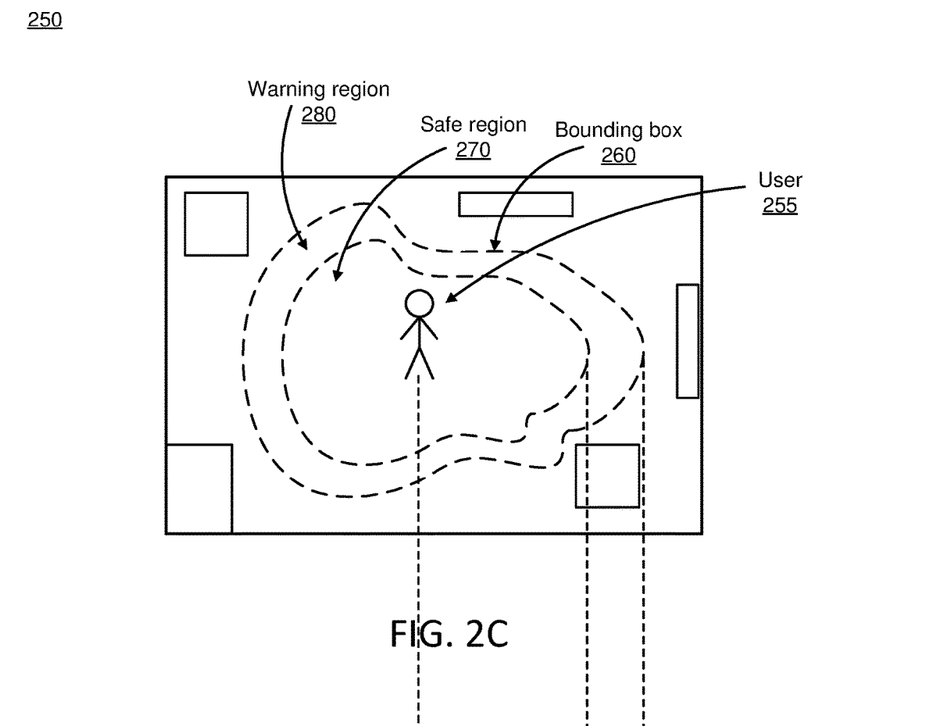
FIGS. 2C-2D illustrate an example scenario involving an example bounding box within which a user is located, in accordance with an embodiment.

FIG. 2C illustrates an example scenario 250 involving an example bounding box 260 within which a user 255 is located, in accordance with an embodiment. In the example scenario 250 of FIG. 2C, the user 255 can be located inside the bounding box 260. In this example, the bounding box 260 can have a non-uniform shape and the center for the bounding box 260 need not be defined, identified, determined, and/or utilized. The inner portion of the non-uniform shape can correspond to a safe region 270. The outer portion surrounding the safe region 270 can correspond to a warning region 280. In this example scenario 250, the user 255 can be located within the safe region 270.

Figure 2D:
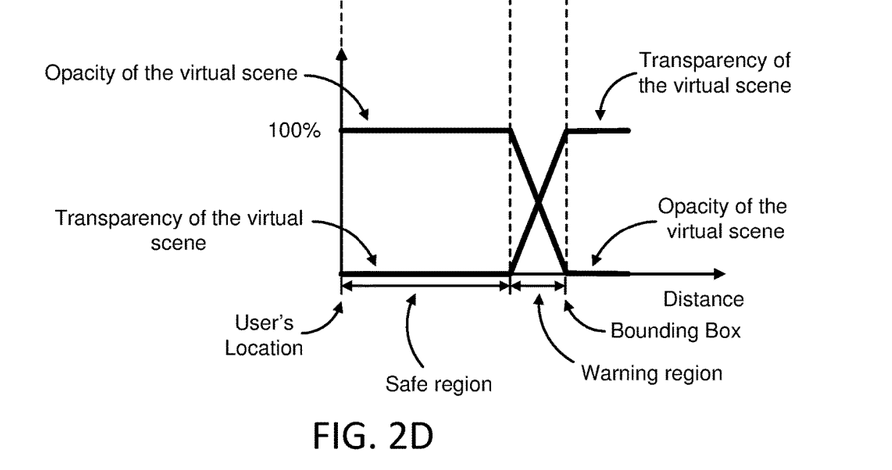

FIG. 2D illustrates the example scenario 250 of FIG. 2C involving the example bounding box 260 within which the user 255 is located, in accordance with an embodiment. FIG. 2D shows an example graph that represents the opacity level, and the corresponding transparency level, of a virtual scene displayed to the user 255 relative to a distance between the user 255 and the boundary(ies) of the safe region 270 and/or relative to a distance between the user 255 and the outer boundary(ies) of the warning region 280. In this example, the percentages of the opacity level and the transparency level can add up to 100%. Many variations are possible.

As shown in FIG. 2D, while the user 255 is determined to be located inside the bounding box 260 and while the distance between (the location of) the user 255 and the boundary of the safe region 270 is greater than a specified threshold (e.g., zero), the VR system 300 can cause an opacity level of the rendered virtual scene to be 100% (or a transparency level of the rendered virtual scene to be 0%), such that the user 255 is only displayed or presented with virtual content. As illustrated in the example graph, if the user 255 is still inside the bounding box 260 but moves into the warning region 280, such that the distance between the user 255 and the outer boundary(ies) of the warning region 280 is less than a specified first threshold but greater than a specified second threshold (e.g., zero), the VR system 300 can cause the opacity level of the displayed virtual scene to decrease (e.g., from 100% to 0%) and can also cause an opacity level of a real-world scene displayed to the user 255 to increase (e.g., from 0% to 100%). For instance, as the user 255 moves within the warning region 280 and closer to the outer boundary(ies) of the warning region 280 (i.e., closer to the bounding box 260), the virtual scene displayed to the user 255 can fade out gradually while the real-world scene fades in gradually. In this instance, when the user 255 is located within the warning region 280, the VR system 300 can cause a combination, blending, and/or mixture of the virtual scene and the real-world scene to be displayed to the user 255. As discussed previously, it should be understood that many variations associated with the disclosed technology are possible.

Figure 3:
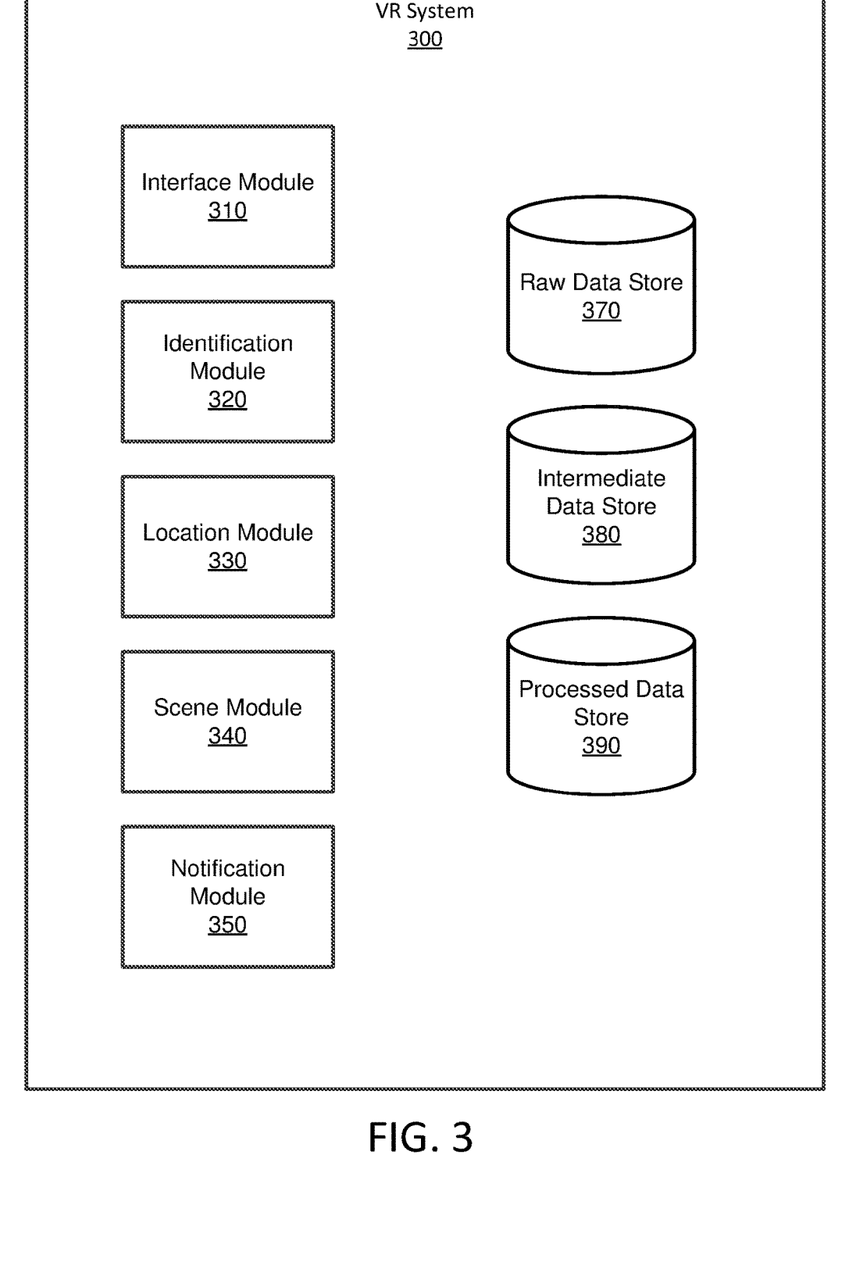
FIG. 3 illustrates a block diagram of an example architecture of the VR system of FIG. 1, in accordance with an embodiment.

FIG. 3 illustrates a block diagram of an example architecture of the VR system 300 of FIG. 1, in accordance with an embodiment. As shown in the example architecture of FIG. 3, the VR system 300 can include an interface module 310, an identification module 320, a location module 330, a scene module 340, a notification module 350, a raw data store 370, an intermediate data store 380, and a processed data store 390. FIG. 3 shows merely one example, and in alternative embodiments not shown, additional and/or different modules or data stores can be included in the VR system 300. For instance, in some implementations, the VR system 300 can also include a head mounted display (HMD) 150 or VR headset. As described above, in some embodiments, the HMD 150 can include an input component 120, such as an outward facing camera.

The interface module 310 can be configured to receive information from the input component 120 as well as to send information to the HMD 150. In one embodiment, as described previously, the input component 120 is included with or part of the HMD 150. The interface module 310 can receive image information (e.g., still frames, video frames, etc.) that can be utilized to facilitate identifying or defining a bounding box, determining a location of the user wearing the HMD 150 relative to the bounding box, and/or determining one or more locations of one or more physical objects in a real-world environment. The interface module 310 can also provide processed information, such as notifications, recommendations, guidance, or warnings to the HMD 150 to be presented to the user. For example, the interface module 310 can provide information indicating the user's relative location and suggesting that the user should return to the safe region if he/she is outside the safe region. It should be understood that many variations are possible.

The identification module 320 can be configured to identify or define a bounding box. For instance, the identification module 320 can be configured to identify or define a first set of one or more boundaries for a safe region within a virtual environment provided by the VR system 300. The bounding box can include or encompass the safe region. In some embodiments, the identification module 320 can include logic that defines or identifies boundaries associated with the bounding box, such as via a default or predefined configuration. In some embodiments, the identification module 320 can utilize image data captured by the input component 120 to facilitate defining or identifying the boundaries associated with the bounding box. For instance, one or more objects in a real-world environment can be identified based on the image data captured by the input component 120 (e.g., via object recognition, line detection, etc.). The identification module 320 can then modify the first set of one or more boundaries for the safe region based on one or more locations of the identified one or more objects in the real-world environment, such that the safe region does not encompass the one or more objects. As such, the boundaries for the safe region (and/or for a warning region) can be updated over time based on various types of information. Additionally or alternatively, in some embodiments, the VR system 300 can utilize one or more input components 120 (e.g., cameras) not installed at the HMD 150. For instance, the one or more input components 120 can be present in the real-world environment, can be utilized to detect or identify the boundary(ies) of the real-world environment (e.g., a local area such as a room), and can be utilized to detect or identify one or more objects within the real-world environment. Based on the detected/identified real-world environment boundary(ies) and/or the location(s) of the one or more detected/identified objects, the identification module 320 can identify or define the bounding box. For example, the identification module 320 can identify or define the bounding box to be a specified minimal threshold distance away from the boundary(ies) of the real-world environment and/or from the edge(s) of the objects.

In some embodiments, the identification module 320 can also facilitate defining a second set of one or more boundaries for a warning region within the virtual environment. The second set of one or more boundaries can be defined to be outside the first set of one or more boundaries such that the warning region corresponds to a region between the first set of boundaries for the safe region and the second set of boundaries. In some cases, the warning region can be included within or encompassed by the bounding box. Moreover, the identification module 320 can further facilitate identifying the center of the bounding box. It should be understood that there can be many variations. For example, in some implementations, the identification module 320 can also be configured to receive manual input for defining or identifying the boundaries associated with the bounding box. Furthermore, in another example, manual effort can be utilized to place one or more physical tags/markers (e.g., colored spots, stickers, tape, etc.) in the real-world environment, such as to identify the boundary(ies) of the real-world environment and/or to indicate where one or more objects are located. In this example, at least one input component 120 (e.g., one or more cameras installed at the HMD, one or more cameras separate from the HMD, or any combination thereof, etc.) can be utilized to determine the locations of the physical tags/markers. The location information for the physical tags/markers can then be utilized by the identification module 320 to identify or define the bounding box. Again, there can be many variations associated with the disclosed technology.

Moreover, the location module 330 can be configured to facilitate determining a location of a user of the VR system 300. In some cases, the determined location of the user can be relative to a virtual environment provided to the user by the VR system 300. For instance, the location of the user can be relative to the bounding box within the virtual environment. In some embodiments, the location module 330 can utilize location data provided via the HMD 150 to determine the location of the user. In one example, the HMD 150 can transmit real-time location data to (the location module 330 of) the VR system 300 such that the user's location can be determined based on the real-time location data. In this example, the HMD 150 can transmit infrared data, Wi-Fi data, gyroscopic data, accelerometer data, Bluetooth data, and/or other wireless or wired signals, etc., to the VR system 300 in order to facilitate determining the location of the HMD 150, which can correspond to the location of the user wearing the HMD 150. Furthermore, in some implementations, the location module 330 can determine the location of the user based on acquiring information from at least one input component 120. In one instance, a camera installed at the HMD 150 can capture image data representing the real-world environment. Based on such image data representing the real-world environment, the location module 330 can calculate the location of the user relative to the real-world environment, and thus can calculate the location of the user relative to the bounding box. In another instance, one or more cameras not installed at the HMD 150 but present in the real-world environment can capture image data that includes a representation of at least a portion of the user. Based on such image data including the representation of at least the portion of the user, the location module 330 can calculate the location of the user relative to the real-world environment (e.g., background) and/or relative to the bounding box. Again, many variations are possible.

Additionally, the scene module 340 can be configured to facilitate displaying a rendered scene including a virtual scene of the virtual environment when the location of the user is determined to be within the first set of one or more boundaries for the safe region. The scene module 340 can render or generate a scene that includes the virtual scene of the virtual environment. The scene module 340 can also be configured to facilitate modifying the rendered or generated scene when the location of the user is determined to be outside the first set of one or more boundaries for the safe region. In some instances, modifying the rendered scene by the scene module 340 can include combining the virtual scene and a real-world scene when the location of the user is determined by the location module 330 to be within the warning region defined or identified by the identification module 320.

In one example, a camera of an HMD 150 associated with the VR system 300 can capture image data representing the real-world scene of a real-world environment (e.g., a local area such as a room). The camera can be facing a direction (e.g., outward facing) in which the user is facing within an allowable deviation. The scene module 340 can render the real-world scene based on the image data. In this example, the rendered real-world scene can correspond to, be similar to, and/or represent what the user would see in the real-world environment if he/she removed the HMD 150. Continuing with this example, the scene module 340 can modify the rendered scene by blending, combining, and/or mixing, etc., the real-world scene and the virtual scene. The rendered scene can be displayed to the user via the HMD 150.

As described above, a distance between the user and a center of the safe region can be determined (by the location module 330) based on the location of the user. The scene module 340 can also be configured to combine or blend the virtual scene and the real-world scene by adjusting, based on the distance between the user and the center of the safe region, a level of transparency at which the virtual scene is rendered and a level of opacity at which the real-world scene is rendered. For instance, the rendered scene can be modified by the scene module 340 in real-time (i.e., near real-time) such that, as the user moves further away from the center of the bounding box, the real-world scene is displayed to the user at a higher opacity level (i.e., at a lower transparency level) and the virtual-scene is displayed at a lower opacity level (i.e., at a higher transparency level). Alternatively, in some embodiments, the center of the safe region, of the warning region, and/or of the bounding box need not be defined, identified, and utilized. Instead, in some cases, one or more distances between the location of the user and the boundary(ies) for the safe region and/or for the warning region can be determined. Based on such distances, the VR system can determine what to render and present to the user via the HMD. For example, when the user is within the bounding box and when the distance between the user and the outer boundary(ies) of the warning region (i.e., the distance between the user and the bounding box) is greater than a first threshold, the VR system can cause one or more virtual scenes of the virtual environment to be displayed to the user, such as at a full opacity level (i.e., a zero transparency level). When the user is within the bounding box and when the distance between the user and the outer boundary(ies) of the warning region is less than the first threshold but greater than a second threshold (e.g., zero), the VR system can cause a combination of the virtual scene(s) and a real-world scene(s) of a real-world environment to be displayed to the user. In this example, the opacity and/or transparency levels of the virtual scene(s) and of the real-world scene(s) can be modified based on this distance. As this distance between the user and the outer boundary(ies) of the warning region decreases, the real-world scene can be displayed to the user at a higher opacity level (i.e., at a lower transparency level) and the virtual-scene can be displayed at a lower opacity level (i.e., at a higher transparency level). Continuing with this example, when the user is outside the warning region (i.e., outside the bounding box), the VR system can cause the real-world scene(s) to be rendered and displayed to the user via the HMD, such as at a full opacity level (i.e., a zero transparency level). Again, it should be appreciated that many variations are possible.

In some cases, adjusting the level of transparency at which the virtual scene is rendered and the level of opacity at which the real-world scene is rendered can include increasing, based on detecting an increase in the distance, the level of transparency at which the virtual scene is rendered and the level of opacity at which the real-world scene rendered. In one example, the level of transparency at which the virtual scene is rendered and the level of opacity at which the real-world scene is rendered are increased to 100% by the scene module 340 when the location of the user is determined by the location module 330 to be outside the second set of one or more boundaries for the warning region identified or defined by the identification module 320. Accordingly, only the real-world scene is displayed to the user when the user is located outside the warning region. This can reduce the likelihood of the user undesirably bumping, hitting, or crashing, etc., into one or more objects in the real-world environment. In this example, the VR system 300 can also pause, stop, or otherwise cease presentation of the virtual environment when the user is outside the bounding box (e.g., outside the warning region).

Moreover, in some instances, adjusting the level of transparency at which the virtual scene is rendered and the level of opacity at which the real-world scene is rendered can include decreasing, based on detecting a decrease in the distance, the level of transparency at which the virtual scene is rendered and the level of opacity at which the real-world scene rendered. For example, the level of transparency at which the virtual scene is rendered and the level of opacity at which the real-world scene is rendered are decreased to 0% by the scene module 340 when the location of the user is determined by the location module 330 to be inside the first set of one or more boundaries for the safe region identified or defined by the identification module 320. As such, the virtual environment can be displayed to the user in its entirety when the user is located inside the safe region.

Furthermore, in some embodiments, when the location module 330 determines that the location of the user is outside at least the first set of one or more boundaries for the safe region, the notification module 350 can generate and/or provide an indication to the user that the location of the user is outside at least the first set of one or more boundaries for the safe region. For example, the notification module 350 can generate a notification to be displayed via the HMD 150 in attempt to inform the user about his/her current location. In some cases, the indication provided by the notification module 350 can include at least one of a visual indication, an audio indication, or a haptic indication. For example, the visual indication can correspond to a text message or a visual animation, the audio indication can include a warning beep or a voice message, and the haptic indication can include a vibration. Again, it should be appreciated that many variations are possible.

In some embodiments, the location module can also assist in defining the bounding box. In some cases, the bounding box can be defined by means of an upgrade to a bounded system, such as by reading maxima from a pre-bounded environment. One or more software upgrades can then refine the bounding process (e.g., bounding algorithm). For example, in some instances, data acquired from one or more accelerometers, gyroscopes, etc., in hand input hardware can be utilized to determine when the user hits or contacts an obstacle. The bounding box can then be reduced in the appropriate area(s)/portion(s) accordingly. In some implementations, the bounding box can have modifiers based on a game type selected via an API. For instance, a game that involves rapid hand motion may cause the bounding box to be modified to accommodate or compensate for the rapid hand motion. In some cases, the disclosed technology can create a polyhedron that allows the user's fists to be swung over desks, but attempts to prevent the user from walking through desks.

The raw data store 370 can be configured to store raw data, such as captured images and/or video provided by the input component 120. The intermediate data store 380 can be configured to store intermediate data such as data related to the bounding box (e.g., location, shape, etc.) and/or the current location of the user relative to the bounding box. The processed data store 390 can be configured to store processed data, such as notifications, indications, suggestions, and/or recommendations, etc., generated by the notification module 350. Again, many variations are possible.

Figure 4A:
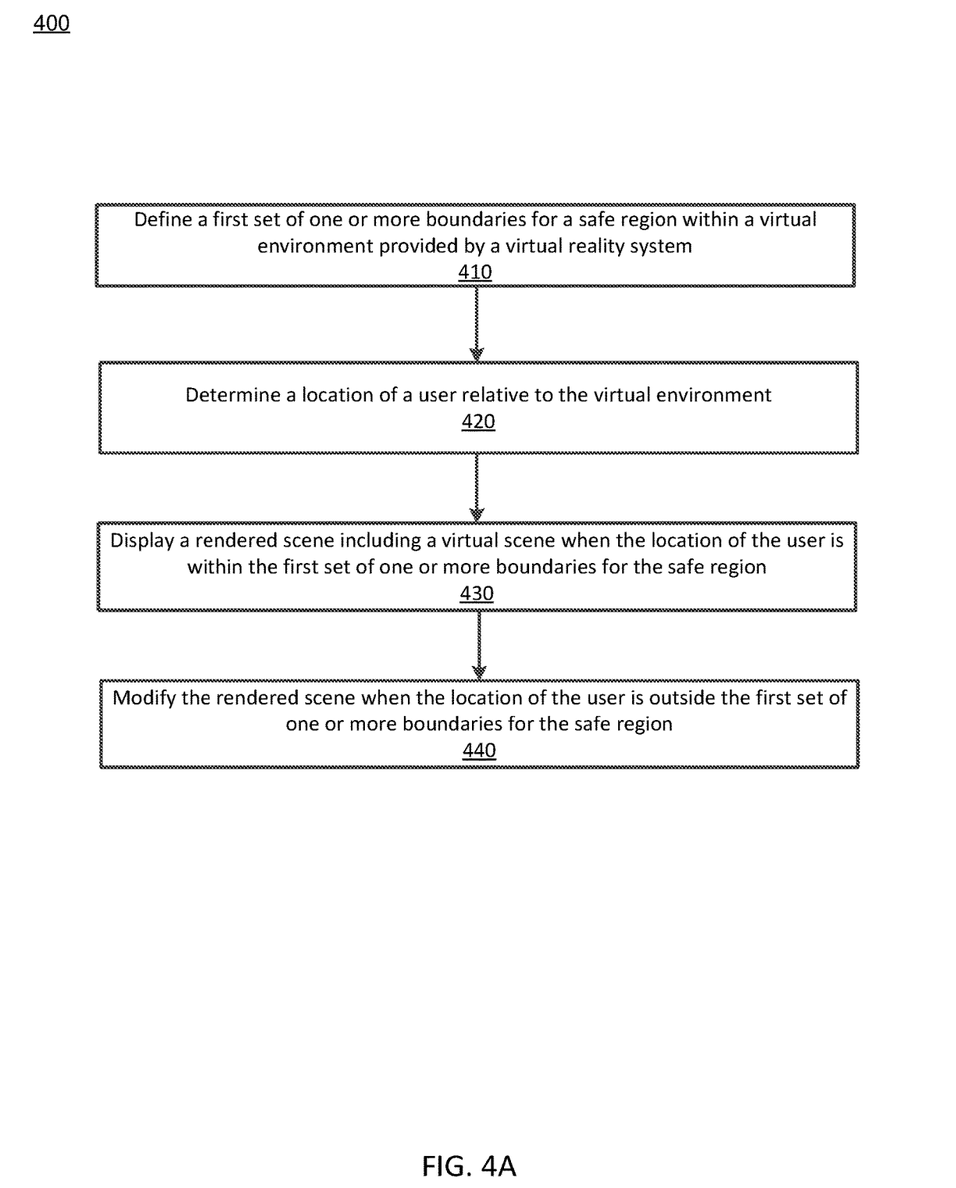
FIG. 4A illustrates a flowchart describing an example process of identifying a bounding box and processing information associated with a user wearing an HMD associated with the VR system, in accordance with an embodiment.

FIG. 4A illustrates a flowchart describing an example process 400 of identifying a bounding box and processing information associated with a user wearing an HMD 150 associated with the VR system 300, in accordance with an embodiment. In the example process 400, at block 410, a first set of one or more boundaries for a safe region within a virtual environment provided by a VR system 300 can be defined or identified, such as by the identification module 320. At block 420, a location of a user of the VR system can be determined, such as by the location module 330. In some cases, the location of the user can be relative to the virtual environment (or relative to a bounding box representable within the virtual environment). At block 430, a rendered scene including a virtual scene of the virtual environment can be displayed when the location of the user is determined to be within the first set of one or more boundaries for the safe region. For instance, the scene module 340 can cause the rendered scene including the virtual scene to be displayed. At block 440, the rendered scene can be modified, such as by the scene module 340, when the location of the user is determined to be outside the first set of one or more boundaries for the safe region. It should be appreciated that there can be many variations.

Figure 4B:
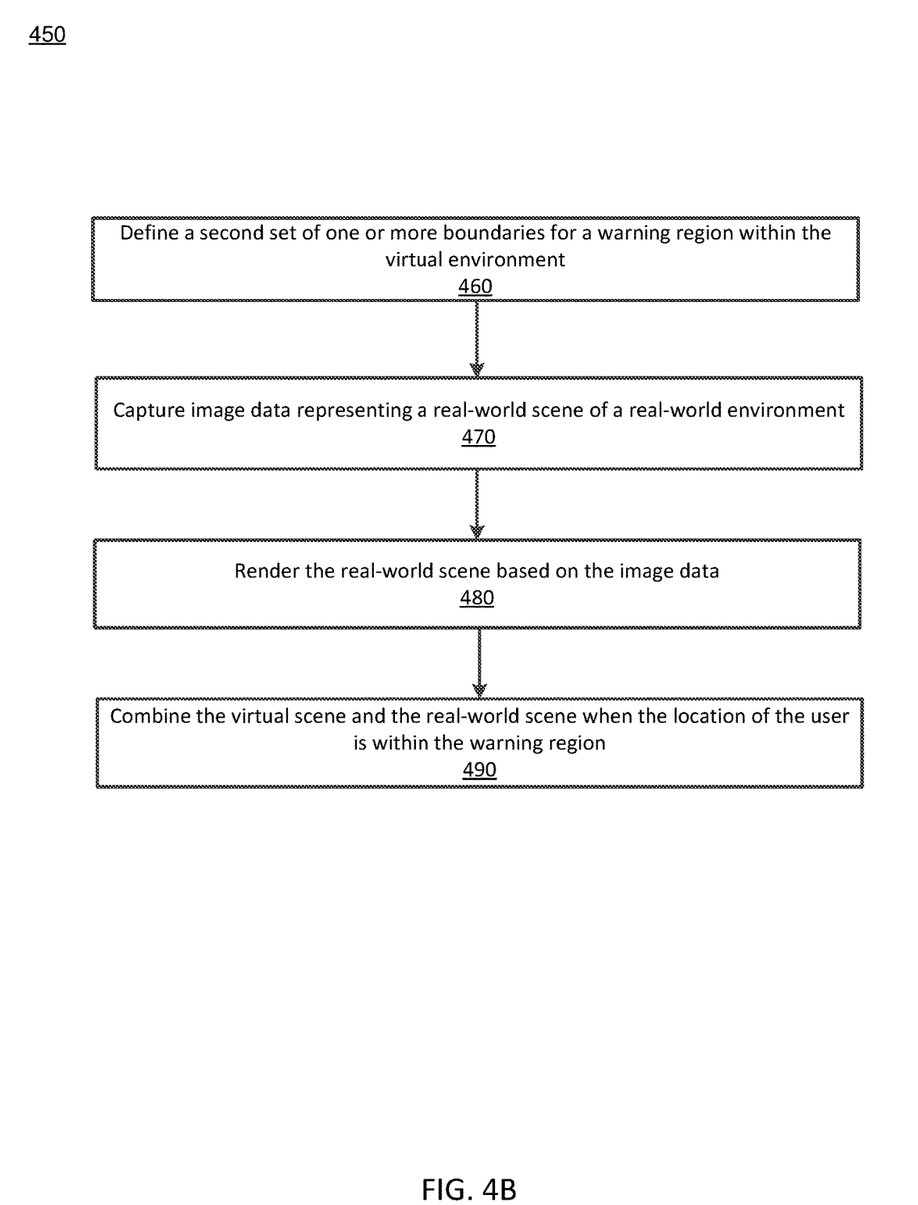
FIG. 4B illustrates a flowchart describing an example process of identifying a bounding box and processing information associated with a user wearing an HMD associated with the VR system, in accordance with an embodiment.

FIG. 4B illustrates a flowchart describing an example process 450 of identifying a bounding box and processing information associated with a user wearing an HMD 150 associated with the VR system 300, in accordance with an embodiment. At block 460, the example process 450 can include defining or identifying, such as by the identification module 320, a second set of one or more boundaries for a warning region within the virtual environment. The second set of one or more boundaries can be defined or identified to be outside the first set of one or more boundaries such that the warning region corresponds to a region between the first set and the second set. At block 470, the VR system 300 can cause image data representing a real-world scene of a real-world environment to be captured by an input component 120 of the HMD 150 associated with the VR system 300. The input component 120 can be a camera that is facing, within an allowable deviation, a direction in which the user is facing. The HMD 150 can be configured to display the rendered scene to the user. At block 480, the real-world scene can be rendered, such as by the scene module 340, based on the image data. At block 490, the rendered scene can be modified, such as by the scene module 340, based on combining the virtual scene and the real-world scene when the location of the user is determined to be within the warning region.

Again, it should be understood that there can be many variations associated with the present disclosure. For instance, in some embodiments, the disclosed technology can attempt to avoid or prevent "clipping" processing in-game. For example, when a user exits a bounding box of a virtual stage, and not just the boundaries of a real-world area, the user can activate a pass-through mode. Accordingly, the disclosed technology can reduce undesirable, immersion-breaking aspects of the user's VR experience.

Additional Configuration Information

The foregoing description of the embodiments of the disclosed technology has been presented for the purpose of illustration; it is not intended to be exhaustive or to limit the disclosed technology to the precise forms disclosed. Persons skilled in the relevant art can appreciate that many modifications and variations are possible in light of the above disclosure.

Some portions of this description describe the embodiments of the disclosed technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed technology may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosed technology may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed technology be limited not by this detailed description, but rather by any claims that issue on an application based hereon. Accordingly, the disclosure of the embodiments of the disclosed technology is intended to be illustrative, but not limiting, of the scope of the disclosed technology, which is set forth in the following claims.

What is claimed is:

1. A computer-implemented method comprising:
   capturing, by a virtual reality system, image data representing a real-world scene of a real-world environment;
   identifying, by the virtual reality system, one or more objects in the real-world environment based on the image data;
   defining, by the virtual reality system, a first set of boundaries for a safe region within a virtual environment provided by the virtual reality system;
   modifying the first set of boundaries for the safe region based on one or more locations of the one or more objects in the real-world environment, wherein the first set of boundaries form a polyhedron having a shape based on the identified one or more objects;
   defining a second set of boundaries for a warning region within the virtual environment, the second set of boundaries forming a second polyhedron having a shape based on the identified one or more objects and being defined to be outside the first set of boundaries such that the warning region corresponds to a region between the first and second set of boundaries;
   determining, by the virtual reality system, a location of a user of the virtual reality system, the location of the user being relative to the virtual environment;
   displaying, by the virtual reality system, a rendered scene including a virtual scene of the virtual environment when the location of the user is determined to be within the first set of boundaries for the safe region; and
   modifying, by the virtual reality system, the rendered scene when the location of the user is determined to be outside the first set of boundaries for the safe region.

2. The method of claim 1, wherein the captured image data is captured by a camera of a head mounted display associated with the virtual reality system, wherein the camera is facing a direction in which the user is facing within an allowable deviation, and wherein the rendered scene is displayed to the user via the head mounted display, and further comprising:
   rendering the real-world scene based on the image data, wherein modifying the rendered scene includes combining the virtual scene and the real-world scene when the location of the user is determined to be within the warning region.

3. The method of claim 2, further comprising:
   determining, based on the location of the user, a distance between the user and a center of the safe region, wherein combining the virtual scene and the real-world scene includes:
   adjusting, based on the distance between the user and the center of the safe region, a level of transparency at which the virtual scene is rendered and a level of opacity at which the real-world scene is rendered.

4. The method of claim 3, wherein adjusting the level of transparency at which the virtual scene is rendered and the level of opacity at which the real-world scene is rendered includes increasing, based on detecting an increase in the distance, the level of transparency at which the virtual scene is rendered and the level of opacity at which the real-world scene rendered.

5. The method of claim 4, wherein the level of transparency at which the virtual scene is rendered and the level of opacity at which the real-world scene is rendered are increased to 100% when the location of the user is determined to be outside the second set of boundaries for the warning region.

6. The method of claim 3, wherein adjusting the level of transparency at which the virtual scene is rendered and the level of opacity at which the real-world scene is rendered includes decreasing, based on detecting a decrease in the distance, the level of transparency at which the virtual scene is rendered and the level of opacity at which the real-world scene rendered.

7. The method of claim 6, wherein the level of transparency at which the virtual scene is rendered and the level of opacity at which the real-world scene is rendered are decreased to 0% when the location of the user is determined to be inside the first set of boundaries for the safe region.

8. The method of claim 1, further comprising:
   determining that the location of the user is outside at least the first set of boundaries for the safe region; and
   providing an indication to the user that the location of the user is outside at least the first set of boundaries for the safe region.

9. The method of claim 8, wherein the indication includes at least one of a visual indication, an audio indication, or a haptic indication.

10. The method of claim 1, further comprising:
    modifying the first set of boundaries for the safe region based on one or more locations of the one or more objects in the real-world environment.

11. A system comprising:
    at least one processor; and
    a memory storing instructions that, when executed by the at least one processor, cause the system to perform:

capturing image data representing a real-world scene of a real-world environment;

identifying one or more objects in the real-world environment based on the image data;

defining a first set of boundaries for a safe region within a virtual environment provided by a virtual reality system;

modifying the first set of boundaries for the safe region based on one or more locations of the one or more objects in the real-world environment, wherein the first set of boundaries form a polyhedron having a shape based on the identified one or more objects;

defining a second set of boundaries for a warning region within the virtual environment, the second set of boundaries forming a second polyhedron having a shape based on the identified one or more objects and being defined to be outside the first set of boundaries such that the warning region corresponds to a region between the first and second set of boundaries;

determining a location of a user of the virtual reality system, the location of the user being relative to the virtual environment;

displaying a rendered scene including a virtual scene of the virtual environment when the location of the user is determined to be within the first set of boundaries for the safe region; and modifying the rendered scene when the location of the user is determined to be outside the first set of boundaries for the safe region.

12. The system of claim 11, wherein the captured image data is captured by a camera of a head mounted display associated with the virtual reality system, wherein the camera is facing a direction in which the user is facing within an allowable deviation, and wherein the rendered scene is displayed to the user via the head mounted display, and wherein the instructions cause the system to further perform:

rendering the real-world scene based on the image data, wherein modifying the rendered scene includes combining the virtual scene and the real-world scene when the location of the user is determined to be within the warning region.

13. The system of claim 12, wherein the instructions cause the system to further perform:

determining, based on the location of the user, a distance between the user and a center of the safe region, wherein combining the virtual scene and the real-world scene includes:

adjusting, based on the distance between the user and the center of the safe region, a level of transparency at which the virtual scene is rendered and a level of opacity at which the real-world scene is rendered.

14. The system of claim 11, wherein the instructions cause the system to further perform:

determining that the location of the user is outside at least the first set of boundaries for the safe region; and providing an indication to the user that the location of the user is outside at least the first set of boundaries for the safe region.

15. The system of claim 14, wherein the indication includes at least one of a visual indication, an audio indication, or a haptic indication.

16. A non-transitory computer-readable storage medium including instructions that, when executed by at least one processor of a computing system, cause the computing system to perform a method comprising:

capturing image data representing a real-world scene of a real-world environment;

identifying one or more objects in the real-world environment based on the image data;

defining a first set of boundaries for a safe region within a virtual environment provided by a virtual reality system;

modifying the first set of boundaries for the safe region based on one or more locations of the one or more objects in the real-world environment, wherein the first set of boundaries form a polyhedron having a shape based on the identified one or more objects;

defining a second set of boundaries for a warning region within the virtual environment, the second set of boundaries forming a second polyhedron having a shape based on the identified one or more objects and being defined to be outside the first set of boundaries such that the warning region corresponds to a region between the first and second set of boundaries;

determining a location of a user of the virtual reality system, the location of the user being relative to the virtual environment;

displaying a rendered scene including a virtual scene of the virtual environment when the location of the user is determined to be within the first set of boundaries for the safe region; and modifying the rendered scene when the location of the user is determined to be outside the first set of boundaries for the safe region.

17. The non-transitory computer-readable storage medium of claim 16, wherein the captured image data is captured by a camera of a head mounted display associated with the virtual reality system, wherein the camera is facing a direction in which the user is facing within an allowable deviation, and wherein the rendered scene is displayed to the user via the head mounted display, and wherein the instructions cause the computing system to further perform:

rendering the real-world scene based on the image data, wherein modifying the rendered scene includes combining the virtual scene and the real-world scene when the location of the user is determined to be within the warning region.

18. The non-transitory computer-readable storage medium of claim 17, wherein the instructions cause the computing system to further perform:

determining, based on the location of the user, a distance between the user and a center of the safe region, wherein combining the virtual scene and the real-world scene includes:

adjusting, based on the distance between the user and the center of the safe region, a level of transparency at which the virtual scene is rendered and a level of opacity at which the real-world scene is rendered.

19. The non-transitory computer-readable storage medium of claim 16, wherein the instructions cause the computing system to further perform:

determining that the location of the user is outside at least the first set of boundaries for the safe region; and providing an indication to the user that the location of the user is outside at least the first set of boundaries for the safe region.

20. The non-transitory computer-readable storage medium of claim 19, wherein the indication includes at least one of a visual indication, an audio indication, or a haptic indication.

* * * * *